June 23, 1964   J. M. BLANCHARD   3,137,882
VIBRATION GENERATING UNIT AND VIBRATION TREATING SYSTEM
Filed April 3, 1961   3 Sheets-Sheet 1
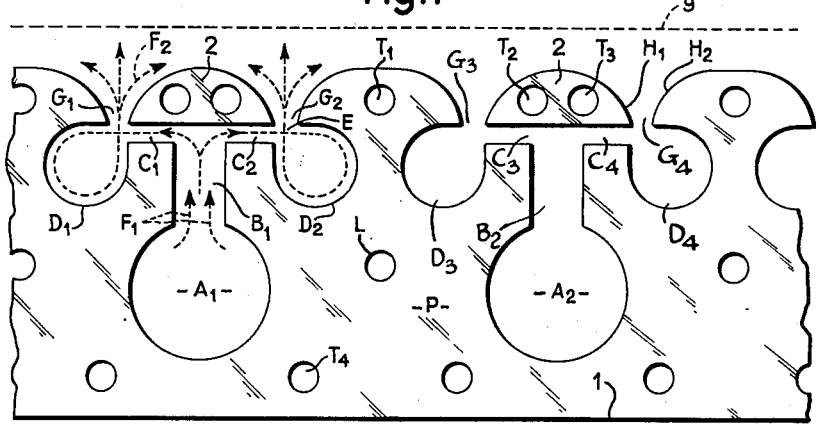
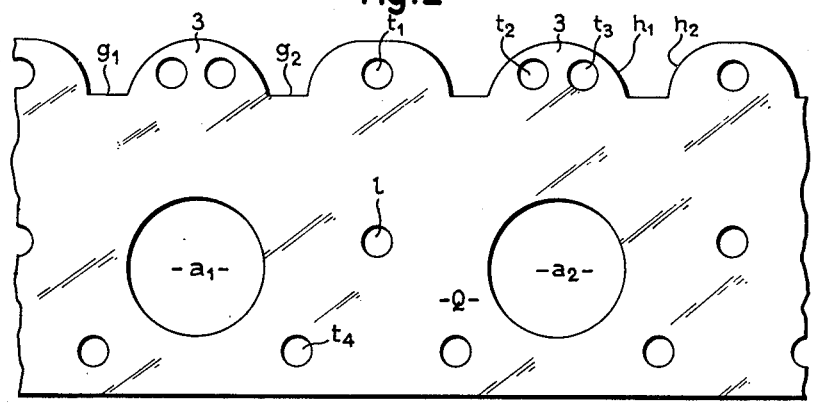
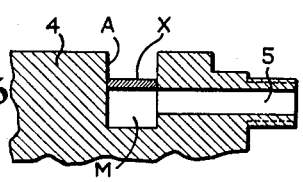
INVENTOR
JEAN MAURICE BLANCHARD
by
ATTORNEYS

INVENTOR
JEAN MAURICE BLANCHARD

June 23, 1964   J. M. BLANCHARD   3,137,882
VIBRATION GENERATING UNIT AND VIBRATION TREATING SYSTEM
Filed April 3, 1961   3 Sheets-Sheet 3
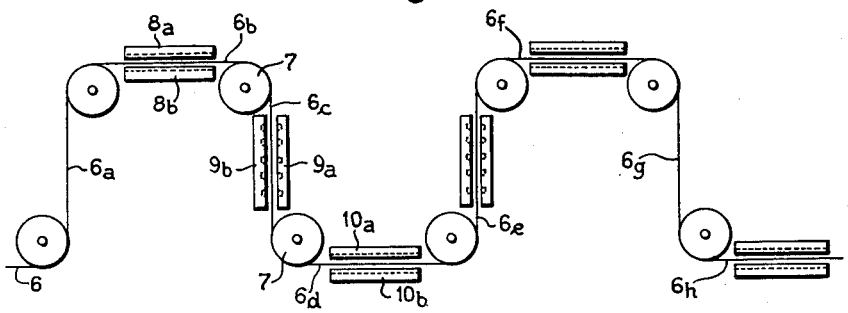
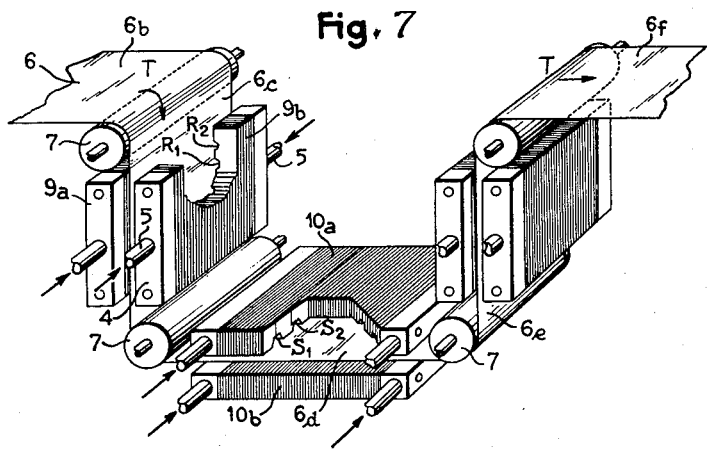
Inventor
Jean Maurice Blanchard
by
Bailey, Stephens & Huettig
Attorneys

United States Patent Office 3,137,882
Patented June 23, 1964

3,137,882
VIBRATION GENERATING UNIT AND VIBRATION TREATING SYSTEM
Jean Maurice Blanchard, La Celle Saint-Cloud, France, assignor, by mesne assignments, to Sirius, Luxembourg (Grand-Duche de Luxembourg) a corporation of Luxembourg
Filed Apr. 3, 1961, Ser. No. 100,078
Claims priority, application France Apr. 7, 1960
17 Claims. (Cl. 15—308)

This invention relates to generators for producing sonic and/or ultrasonic vibrations in fluid media, and to systems for treating materials with vibrations produced by such generators. In my U.S. Patent No. 3,071,145, I have described a vibration generator comprising a stack of plates or strips in some of which fluid flow paths of special configuration are defined by suitable cutouts formed in the plates, and means for simultaneously feeding a fluid, e.g. air under pressure, to all said flowpaths by way of ducts formed through the stack by means of aligned openings in all the stacked plates. The configuration of the flowpaths in said plates is such that the fluid is forced to describe one or more loops, so that interactions of interference are present between different portions of the fluid at the cross-over points of the loops; these interactions operate by a sort of "whistle effect," i.e. a phenomenon equivalent to that produced by the airflow around the interior of the cylindrical chamber in an ordinary whistle, to set the body of fluid into sonic and/or ultra-sonic vibration. The active plates in which these looped flowpaths are formed are separated by intervening separator plates such that the motion of the fluid in each active plate occurs substantially on a plane. Reference may be had to the afore-mentioned patent for a more detailed understanding of the operation of such a generator.

It is an object of this invention to provide a sonic and/or ultrasonic vibration generator operating on the same principle as that of the afore-mentioned patent, but so designed that the vibrations generated therein will be radiated outwards of the generator rather than remaining substantially within the generator as was the case in the construction disclosed in my prior patent.

Another object is to provide an improved sonic and/or ultrasonic vibration generator which will be capable of creating a vibratory field extending over a continuous surface, e.g. a plane, or a surface of any other desired geometrical configuration.

Such a generator will have evident utility in the vibration-treatment of surfaces, e.g. the surface of a web or sheet of material fed in the plane of the vibratory field created by the improved generator according to the last preceding paragraph. Hence, an additional object of this invention is to provide an improved system for the continuous vibration-treatment of webs or sheets of material, e.g. webs of fabric, paper, sheet metal and the like.

In accordance with an aspect of the invention there is provided a vibration generator comprising a plurality of stacked plates, aligned openings in said plates defining a duct through the stack, means for discharging fluid under pressure through said duct, cutouts in each of at least a set of first plates of the plurality communicating with the opening therein and defining a fluid flowpath in each first plate including at least one looped flow portion for providing vibration-creating interaction between different portions of said fluid in the flowpath, and aligned outlets in corresponding edges of said plates connected with said cutouts and defining a groove across a face of the stack, whereby on discharge of fluid through said duct vibrations will be created in the flowpaths of all said first plates and all said vibrations will be radiated outwards through said outlets to combine their actions along a line extending exteriorly of the stack parallel to said groove.

In accordance with another aspect, there is provided a vibration generator comprising a plurality of stacked plates, spaced openings in said plates alignable to define spaced ducts through the stack, means for discharging fluid under pressure through the ducts, cutouts in each of at least a set of first plates of the plurality communicating with the openings therein and defining fluid flowpaths in said first plates including looped flow portions for providing vibration-generating interactions between different portions of the fluid in each flowpath, and spaced outlets in an edge of each plate connected with said cutouts and alignable to define a set of spaced grooves across a face of the stack, whereby on discharge of fluid through said ducts vibrations are generated in all said first plates and all said vibrations are radiated outwards through said outlets to combine their actions along parallel spaced lines extending exteriorly of the stack parallel to said grooves for providing a vibratory field on a substantially continuous surface.

Exemplary embodiments of the invention will now be described for purposes of illustration but not of limitation with reference to the accompanying drawings wherein:

FIG. 1 is a fragmentary plan view of a so-called active plate forming part of a vibration generator according to one embodiment of this invention;

FIG. 2 similarly shows a so-called spacer plate thereof;

FIG. 3 similarly shows a so-called suction plate according to another embodiment of the invention;

FIG. 5 is a fragmentary sectional view of an end or manifold member used in the vibration generator;

FIG. 6 is a diagrammatic view illustrating a system for treating a continuous web of flexible material, e.g. fabric or paper, by means of a plurality of vibration generator units of the improved construction described herein; and FIG. 7 is a perspective view showing a part of the system of FIG. 6 and further illustrating some additional features of the vibration generators used in it.

Figure 3:
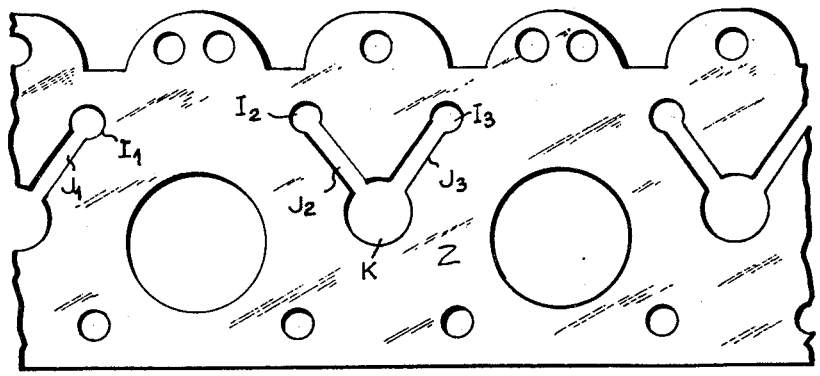

An ultrasonic generator unit according to the invention in the embodiment shown comprises a stack of plates or strips of two principal types respectively shown at P in FIG. 1 and Q in FIG. 2, with the two types of plates alternating along the depth of the stack. The plates P are the so-called active plates since they act to generate the vibrations while the plates Q are idle or spacer plates. Registering perforations such as T1 through T4 in the P plates and t1 through t4 in the spacer plates serve to assemble the stacked plates into a unitary assembly by means of suitable bolts or the like, not shown. Formed through the active plates P at equal spacings along the length of each plate is a row of large apertures such as A1, A2 registering with these are corresponding apertures such as a1, a2 formed in the spacer plates or strips Q. Thus the registering openings such as A1, a1, or A2, a2 define spaced ducts extending through the generator unit and all these ducts are interconnected at one end or each end of the unit with a fluid inlet manifold for the circulation of a vibration-generating fluid through the unit, such as air from a pressure source.

The active strips P are formed with cutouts communicating with the fluid flow apertures A1, A2 and of such configuration that the fluid in flowing through the flowpaths defined by these cutouts, in each active strip, describes loops whereby different portions of the fluid are caused to interfere with another thereby generating sonic and/or ultrasonic vibrations by an effect similar to that occurring in a whistle. It is evident that great variety of topological configurations may be conceived for achieving this type of operation, and FIG 1 illustrates one suitable pattern of this kind. With each of the flow apertures such as A1 in each active strip P there is associated a pair of apertures vortex cavities D1, D2 formed in the strip at such positions that the centres of each set of three associated apertures such as A1, D1, D2 define an isosceles triangle with the centre of A1 at the apex of the triangle. A T-shaped flowpath channel interconnects each opening A1 with both associated vortex cavities D1 and D2, such flowpath including as shown a broad central leg B extending from aperture A1 and aligned narrower legs $C_1$–$C_2$, and $C_3$–$C_4$ extending in opposite directions from the legs $B_1$ and $B_2$ respectively normally thereto and opening into the respective cavities $D_1$–$D_2$ and $D_3$–$D_4$. The latter cavities as shown are all aligned on a direction parallel to the long edges, such as 1, of the strip. In accordance with an important feature of this invention, the cavities $D_1$ to $D_4$ all communicate with the exterior medium by way of flared, rounded outlets such as $G_1$, $G_2$, $G_3$ and $G_4$, defined by suitable rounded edge portions of the strip edge.

As shown in the left-hand half of FIGURE 1, in operation, when fluid is passed through the ducts defined in the stack by the registering openings A1, some of the fluid issues continually out of the openings A1 of each strip by way of the flow channel $B_1$, leading therefrom as indicated by the arrows F1 and then through the channels C1 and C2 into both vortex cavities D1, D2. In each of these cavities the fluid is forced into a loop or vortex and the interference of the fluid particles at points such as E which constitute crossing points of the loops, creates a "whistle effect" and a consequent generation of high-powered sonic and/or ultrasonic vibrations. As will be evident, with the cutout pattern illustrated, the fluid issues out of the cavities by way of the flared outlets such as G1 and the generated vibrations are consequently radiated into the surrounding medium.

It will be understood that when the strips are stacked as described above, the outlets such as G1 and the corresponding flared recesses such as $g1$ (FIG. 2) formed in the spacer plates Q in registry with said outlets, are all aligned together and define continuous grooves spaced across the complete generator unit, as indicated e.g. at R1, R2, in FIG. 7. All the waves issuing out of these grooves from the outlets such as G1 formed in the active strips P combine their actions and it is found that standing wave trains can thus be established having their nodes and loops positioned on common surfaces such as the surface indicated by its trace $y$ on the plane of FIG. 1. In other words, a vibratory field can thus be created which extends along a substantially continuous surface in the surrounding medium. Desirably, in using such an ultrasonic generator for the purpose of a continuous treatment such as will be presently described, it is arranged that the work to be treated, such as a web of fabric for example, will travel along a vibratory surface such as $y$ at which a maximum wave amplitude obtains. The precise position of such surface and the consequent optimum path of travel for the work to be treated can readily be determined by experiment for each particular form of generator.

As shown the flaring outlets such as G1 are defined in the plates P by rounded edges such as H1, H2, of respective portions of the plate. Conveniently the rounded edge such as H1, on one side of each outlet is provided by an arcuate insert 2 separate from the main body of the plate P and secured thereto by means of certain of the assembly bolts extending through apertures T2, T3 in the insert. At a corresponding location in the spacer plates Q there is a rounded portion 3 integral with the plate and formed with the corresponding bolt holes $t2$, $t3$.

It has been found according to the invention that a more effective generation of vibrations is had if suction is applied to the fluid in the center of the vortex cavities such as $D_1$ to $D_4$. This prevents the formation of a quiescent core of stagnant fluid in the center of the vortex. A convenient way of providing this suction effect is to provide in the stack of plates comprising the generator unit a third type of specially formed suction plates or strips Z (FIGURE 3) in addition to the active strips P and spacer strips Q. The suction strips Z may be interposed between each active plate P and the adjacent spacer plate Q, or at less frequent intervals if preferred.

Each suction plate Z whose shape is much the same as that of spacer plates Q further includes additional configurations which have been shown in FIG. 3. Thus each suction strip Z is formed with pairs of small-radius holes I1 and I2 positioned for coaxial alignment with the vortex cavities D1, D2 of the active strips P, and with suction openings K connected with each pair of holes I1, I2 by passages J1, J2. Holes L and 1 are formed in the plates P and Q respectively for alignment with the suction openings K so as to provide continuous suction ducts through the stack when all three types of strips (P,Q,Z) are assembled into a stack. These ducts are then connected at the sides of the unit with inlet and outlet suction manifolds, not shown. The fluid thus drawn off by the suction means may be recycled if desired.

FIG. 5 illustrates a fragmentary cross section of one of the side or end flanges 4 provided at each end of a generator unit, as shown in FIG. 7. As shown, all the ducts defined through the stack by the aligned flow openings A, $a$, in the active and spacer plates P and Q and the suction plates if used are connected at one or each end with a common manifold channel M extending through the end member 4, below a partition X. The manifold M is shown connected with an intake duct 5 formed transversely through the end member for connection with a source of the vibration-generating fluid, e.g. air, under suitable pressure.

FIGS. 6 and 7 illustrate a system according to the invention for subjecting to sonic and/or ultrasonic vibration treatment a continuous web of flexible material using a plurality of vibration generating units of the type described above.

As shown the web of material 6, e.g. textile fabric, is passed over a sinuous path by means of suitable disposed guide rollers such as 7 some of which may be power driven for imparting a continuous feed displacement to the web. Between the guide rollers 7 a plurality of segments or flights $6a$, $6b$, $6c$, $6d$, $6e$, $6f$, $6g$, $6h$ are defined in the web and each (or each of some) of these flights has vibration generating means according to the invention associated with it. Desirably, as shown, there is a pair of vibration generating units of the type described above associated with each flight of the web, disposed on opposite sides of the web, as shown at $8a$–$8b$, $9a$–$9b$, $10a$–$10b$, and so on. As mentioned earlier herein, the units such as $8a$ and $8b$ of a common pair are preferably so spaced from each other and from the adjacent surfaces of the work that said work surfaces extend substantially along the planes of maximum vibration amplitude produced by each generator unit, such as the plane $y$ shown in FIG. 1. The grooves such as R1, R2 (FIG. 7) of each unit defined by the registering outlets G and $g$ in the stacked strips of the unit, may be parallel as between both units of a common pair such as $8a$–$8b$. Desirably however, both units of each pair may be so arranged that the said grooves extend at right angles to each other since it has been found that a more efficient vibration treatment can thus be obtained. Desirably also, the directions of said grooves between adjacent units along the longitudinal direction of the web, may also be arranged at right angles to each other as shown in FIG. 7 for the units $9b$ and $10b$, where it is seen that grooves R1, R2 in the vertically disposed unit $9b$ extend horizontally, i.e. widthwise of the web, while the corresponding grooves S1, S2 in the horizontally disposed unit $10b$ extend lengthwise of the web. Other suitable arrangements could of course be used.

Referring to FIG. 7, it is further seen that the generator units used are of two sizes, the horizontal units such as 10b being larger than the vertical units such as 9b. The larger units 10b are shown as provided with four fluid intake connections and the smaller units 9b with only two intake connections, all of which may be connected with a common source of pressure fluid such as air.

It will be understood that the vibration treating system schematically shown in FIG. 6 may actually be associated with any other desired treating apparatus, such as treating baths through which the web may be passed and in which vibration generators according to the invention may be positioned. The invention is applicable to textile, paper and other webs for dying treatments, cleaning treatments, surface treatments, and other processes involving exposure of the web to a processing fluid and susceptible of being enhanced by the application of sonic and/or ultrasonic vibrations during such exposure.

Figure 4:
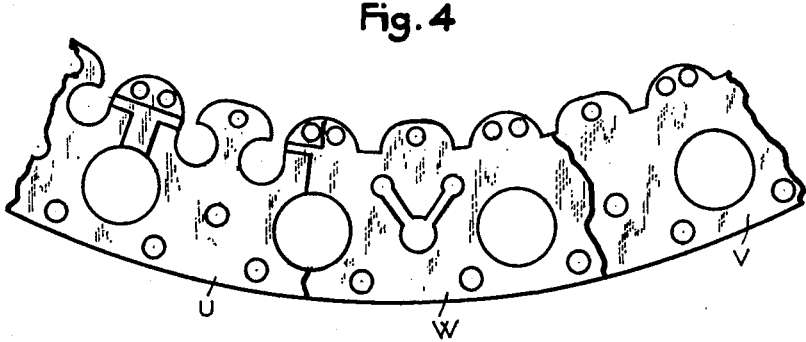
FIG. 4 is a fragmentary plan view of plates constituting a stack, the face of which is cylindrical.

While the improved vibration generators of the invention are of especial advantage when used in connection with continuous strips or webs of material as described with reference to FIGS. 6 and 7 it should be understood that they are useful also in other circumstances wherever it may be desired to create generally planar vibratory fields, or vibratory fields extending over a surface of other geometrical shape. Thus, the invention contemplates vibration generator units of the general type described, but wherein the active surface of the unit, i.e. the surface in which the grooves such as R1, R2 (FIG. 7) open, may be other than flat, e.g. part-cylindrical or part-spherical. For example, the component plates or strips such as U, V and W in FIG. 4 may have their cut-out edges (the upper edges in FIG. 4) extending along an arcuate, e.g. concave, line. In FIGURE 4, there is shown, partially broken away, a stack of plates U, V and W corresponding to plates P, Q and Z of FIGURES 1, 2 and 3, respectively. The plates U, V and W only differ from plates P, Q and Z in that their edges are of general arcuate configuration; the patterns of cutouts provided in these arcuate plates are the same as those described with reference to FIGURES 1 to 3. In such case the resulting grooved surface of the generator unit comprising a stack of such plates would be part of a concave cylinder, and the vibratory field surface produced thereby would be part fully or partly cylindrical rather than the flat surface indicated by its trace y in FIG. 1. Any such modifications are expressly understood as included within the scope of the invention, since one of the chief advantageous and novel characteristics of it is the possibility it provides of simply and efficiently creating high-powered vibratory fields in a fluid medium along any desired geometrical surface of regular or irregular configuration as defined by the general or average contour of the cutout edge of each component plate of the stack. As other possible modifications in this respect, the plates may be formed with a cutout edge having a generally sinuous mean contour, or an annular contour if desired. Also, the pattern of cutouts formed in the active plates may differ considerably from that shown in FIG. 1, since as already mentioned a great many different suitable patterns may be conceived for producing fluid vibrations by "whistle effect" involving an interference between different portions of the fluid flowing along a flowpath including one or more loops therein.

What I claim is:

1. A whistle-type vibration generator comprising a plurality of stacked plates, aligned openings in said plates defining a duct through the stack, means for discharging fluid under pressure through said duct, cutouts in each of at least a set of first plates of the plurality communicating with the opening therein and defining a fluid flowpath in each first plate, said flowpath intersecting itself at least at one point and including at least one looped flow portion for providing vibration-creating interaction between different portions of said fluid in the flowpath, and aligned indentations in all of said stacked plates defining a groove across a face of the stack, the indentations provided on said first plates being connected with said cutouts to provide outlets whereby on discharge of fluid through said duct vibrations will be created in the flowpaths of all said first plates and all said vibrations will be radiated outwards through said outlets to combine their actions along a line extending exteriorly of the stack parallel to said groove.

2. A generator as claimed in claim 1, wherein all said indentations have rounded outwardly flared side walls.

3. A generator as claimed in claim 1, wherein in said first plates said flowpath comprises generally T-shaped channel means having said opening connected with the free end of the central leg of the T and a pair of vortex cavities connected to the opposite ends of the crossbar of the T.

4. A vibration generator as claimed in claim 3, including a suction channel communicating with a central part of each of said vortex cavities and connected with suction means for drawing out fluid from said central part of each cavity.

5. A whistle-type vibration generator comprising a plurality of stacked plates, spaced openings in said plates alignable to define spaced ducts through the stack, means for discharging fluid under pressure through the ducts, cutouts in each of at least a set of first plates of the plurality communicating with the openings therein and defining fluid flowpaths in said first plates, each of said flowpaths intersecting itself at least at one point and including looped flow portions for providing vibration-generating interactions between different portions of the fluid in each flowpath, and spaced indentations in an edge of said stacked plates alignable to define a set of spaced grooves across a face of the stack, the indentations provided on said first plates being connected with said cutouts to provide outlets, whereby on discharge of fluid through said ducts vibrations are generated in all said first plates and all said vibrations are radiated outwards through said outlets to combine their actions along parallel spaced lines extending exteriorly of the stack parallel to said grooves for providing a vibratory field on a substantially continuous surface.

6. A generator as claimed in claim 5 wherein all said indentations are outwardly flared.

7. A generator as claimed in claim 5, wherein each of said flowpaths comprises generally T-shaped channel means having said openings connected with the free end of the central leg of the T and a pair of vortex cavities connected to the opposite ends of the crossbar of the T, and wherein said outlets comprise outwardly flared channels extending from points adjacent said vortex cavities and leading to the edges of the first plates.

8. A vibration generator as claimed in claim 7, including a set of further plates interspersed with said first plates, each formed with openings alignable with said openings in the first plates to contribute to defining said ducts, and having indentations at the corresponding edges thereof alignable with said outlets of the first plates to contribute to defining said grooves, and having further apertures therein alignable with said vortex cavities in the first plates but of smaller radius than they, suction apertures in said plates alignable to provide a suction duct, connectable with suction means, and passages in said other plates connecting said further apertures with said suction apertures therein whereby application of said suction means will draw off fluid from a central portion of each of said vortex cavities.

9. A vibration generator as claimed in claim 5 including a set of second plates interspersed with said first plates and each formed with openings alignable with said openings in the first plates to contribute to defining said ducts, and having its indentations at the corresponding edges thereof alignable with said outlets of the first plates to contribute to defining said grooves.

10. A vibration generator as claimed in claim 5, wherein said face of the stack is flat.

11. A vibration generator as claimed in claim 5, wherein said face of the stack is at least part-cylindrical.

12. A plant for vibration-treating a strip-like length of material comprising means for feeding said material through a treating zone, and at least one vibration generator as claimed in claim 1 positioned in said zone, said generator including a surface parallel to and spaced from the path of motion of said material fed therepast and a plurality of spaced grooves in said surface and vibratory fluid flow means in said generator for generating vibrations therein and radiating said vibrations out through said grooves on to said material.

13. A plant for vibration-treating a strip-like length of material comprising means for feeding said material through at least one treating zone, and a pair of vibration generators as claimed in claim 1 in said zone on opposite sides of the path of motion of the material, each generator having a surface parallel to and spaced from said material and a plurality of spaced grooves in said surface and vibratory fluid flow means in said generator for generating vibrations therein and for radiating said vibrations out through said grooves into a related side of said material.

14. A plant as claimed in claim 13, wherein said grooves extend at right angles to one another as between both generators of the pair.

15. A plant for vibration-treating a strip-like length of material comprising means for feeding said material through a treating zone and at least one vibration generator as claimed in claim 5 positioned in said zone such that said material is fed past said generator in parallel-spaced relation with said face thereof and substantially along said continuous vibratory surface.

16. A plant for vibration-treating a strip-like length of material comprising means for feeding said material through a treating zone and a pair of vibration generators as claimed in claim 5 positioned in said zone on opposite sides of said material and having said faces directed towards the opposite sides of said material.

17. A vibration-treating plant as claimed in claim 16 wherein said pair of vibration generators are so disposed that said grooves therein are mutually at right angles.

References Cited in the file of this patent
UNITED STATES PATENTS 2,755,767  Levavasseur _____ July 24, 1956

FOREIGN PATENTS 687,970  Great Britain _____ Feb. 25, 1953